United States Patent
Stern et al.

(10) Patent No.: US 10,417,631 B2
(45) Date of Patent: *Sep. 17, 2019

(54) SYSTEMS AND METHODS FOR ACTIVATING ACCOUNT CARD FUNCTIONS BASED ON PHYSICAL DEVICE INTERACTIONS

(71) Applicant: Capital One Services, LLC., McLean, VA (US)

(72) Inventors: Matthew Stern, San Francisco, CA (US); Makiko Taniguchi, San Francisco, CA (US); Dan Makoski, Palo Alto, CA (US); Lin Yang, San Francisco, CA (US); Carl Cepress, Mountain View, CA (US); Austin Anderson, San Francisco, CA (US); Jason Deperro, San Mateo, CA (US)

(73) Assignee: Capital One Services, LLC, McLean, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/207,419

(22) Filed: Dec. 3, 2018

(65) Prior Publication Data

US 2019/0114621 A1 Apr. 18, 2019

Related U.S. Application Data

(63) Continuation of application No. 16/141,388, filed on Sep. 25, 2018, now Pat. No. 10,275,763, which is a (Continued)

(51) Int. Cl.
*G06Q 20/34* (2012.01)
*G06Q 20/40* (2012.01)
*G07F 7/08* (2006.01)

(52) U.S. Cl.
CPC ....... *G06Q 20/354* (2013.01); *G06Q 20/3415* (2013.01); *G06Q 20/355* (2013.01);
(Continued)

(58) Field of Classification Search
None
See application file for complete search history.

(56) References Cited

U.S. PATENT DOCUMENTS 10,083,438 B2 * 9/2018 Stern .................... G06Q 20/354
10,147,085 B2 * 12/2018 Stern .................... G06Q 20/354
(Continued)

FOREIGN PATENT DOCUMENTS

| DE | 10/248389 A1 | 8/2004 |
|---|---|---|
| WO | WO 2008/09257 A1 | 8/2008 |

OTHER PUBLICATIONS

European Search Report dated Mar. 7, 2019 for Application No. 16835798.6—12/17 3335173 PCT/US2016046234 (8 pages).

*Primary Examiner* — Kristy A Haupt
(74) *Attorney, Agent, or Firm* — Finnegan, Henderson, Farabow, Garrett & Dunner LLP

(57) ABSTRACT

Systems and methods are provided for activating a function of an account card based on physical devices interactions such as a motion pattern detected by the account card. In some embodiments, the account card may include one or more sensors and processing capabilities sufficient to store a motion pattern, detect a motion pattern representing movement of the account card, compare the detected motion pattern to the stored motion pattern, and activate one or more functions of the account card based on the comparison. In some embodiments, the one or more functions may relate to account information communication, such as writing a magnetic stripe, unblocking a magnetic stripe, activating a near field communication chip, displaying an account number, providing power to an antenna, or otherwise enabling com-
(Continued)

munication of the account number based on the capabilities of the card.

20 Claims, 6 Drawing Sheets

Related U.S. Application Data continuation of application No. 15/232,734, filed on Aug. 9, 2016, now Pat. No. 10,147,085.

(60) Provisional application No. 62/203,042, filed on Aug. 10, 2015.

(52) U.S. Cl.
CPC ......... *G06Q 20/409* (2013.01); *G07F 7/0813* (2013.01); *G07F 7/0833* (2013.01); *G06Q 2220/00* (2013.01)

(56) References Cited

U.S. PATENT DOCUMENTS

| | | |
|---|---|---|
| 2010/0033299 A1 | 2/2010 | Davis |
| 2011/0282785 A1 | 11/2011 | Chin |
| 2014/0015470 A1 | 1/2014 | Lim et al. |
| 2015/0006378 A1 | 1/2015 | Blythe |
| 2015/0006385 A1 | 1/2015 | Shah |
| 2015/0213351 A1 | 7/2015 | Wyatt |

\* cited by examiner

SYSTEMS AND METHODS FOR ACTIVATING ACCOUNT CARD FUNCTIONS BASED ON PHYSICAL DEVICE INTERACTIONS

CROSS REFERENCE TO RELATED APPLICATIONS

This application is a continuation of U.S. patent application Ser. No. 16/141,388, filed Sep. 25, 2018, which claims priority to U.S. patent application Ser. No. 15/232,734, filed Aug. 9, 2016 (now allowed), which is entitled to and claims the benefit of priority from U.S. Provisional Application No. 62/203,042, filed Aug. 10, 2015, the contents of each of which are expressly incorporated herein by reference.

BACKGROUND

Account cards are used in many aspects of daily life, including gaining access to secure locations, providing identifying information, and performing monetary transactions. In some situations, mobile devices such as smartphones are replacing traditional cards, such as mobile devices having apps for making payments at point-of-sale locations or accessing a hotel room. But traditional cards still remain the most commonly-used mechanism for providing account information, thanks to their small form factor, convenience, and the highly developed infrastructure for receiving account information from cards such as magnetic card readers.

Compared to mobile electronic devices, traditional cards have more inherent security risks. While mobile electronic devices are usually locked with a passcode or PIN to prevent unauthorized usage, traditional cards are inherently unlocked and can be used by anyone in possession of the card. Thus, when a card is lost or stolen, the finder or thief can use the card at will, until an intervening event occurs, such as the card issuer disabling the card, a diligent cashier refusing the card upon checking the cardholder's identification, or destruction of the card. Often times, card issuers and the true cardholders suffer the consequences of fraudulent activities by the time the card number is cancelled or changed.

In view of the shortcomings of current systems and methods for providing account information, a robust, secure, and efficient mechanism for controlling activation of account card devices is desired.

SUMMARY

Disclosed embodiments provide systems and methods for activating account card functions based on physical gestures.

Consistent with a disclosed embodiment, an apparatus for providing account information is provided. The apparatus may comprise a housing, a power source, at least one sensor, a data transmitter, a memory storing instructions and account information, and a processor. The processor may be configured to execute the stored instructions to detect, using the at least one sensor, a motion pattern corresponding to a physical gesture performed using the apparatus, and activate, based on the detected motion pattern, the data transmitter to provide the stored account information.

Consistent with another disclosed embodiment, a method for providing account information is provided. The method may comprise detecting, by a device including at least one processor in communication with at least one sensor, a motion pattern corresponding to a physical gesture performed using the device, and activating, based on the detected motion pattern, the data transmitter to provide account information stored in a memory in the device.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

The disclosed embodiments are directed to systems and methods for activating account card devices using physical device interactions such as gestures. In particular, systems and methods allow users to activate one or more functions of an account card using physical gestures, such as a pattern of motion. Some of the disclosed embodiments provide new account card hardware having specialized components for activating the account card. Some of the embodiments provide specialized methods and processes for programming and using the account card.

In some embodiments, physical gestures may include one or more movements performed in a sequence that results in a motion pattern. Movements may include, for example, vertical shaking, horizontal shaking, random shaking, twisting, twirling, drawing a picture or character(s) in air, tapping, flipping, positioning in a certain orientation, sliding, and any other type of physical movement capable of detection using one or more known sensors.

In some embodiments, an account card of an approximate size and shape of a traditional card may have embedded electronics capable of detecting a motion pattern corresponding to a physical gesture that a user performs while holding the account card. One or more processors in the account card may detect the motion pattern, and compare the motion pattern to a previously-recorded motion pattern, to verify a matching pattern. If the motion pattern matches, then the processor may activate one or more functions of the account card, enabling the account card to transmit account information. For example, the processor may write account information to a magnetic stripe of the account card, allowing the magnetic stripe to provide the account information when the account card is read in a standard card reader. As another example, the processor may activate a near field communication (NFC) chip to allow transmission of account data, whereas prior to detecting the motion pattern, the NFC chip would not activate. Therefore, the account card may only become useful for providing account information once a verified motion pattern is detected, and users may benefit from the added levels of security in a card form-factor.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
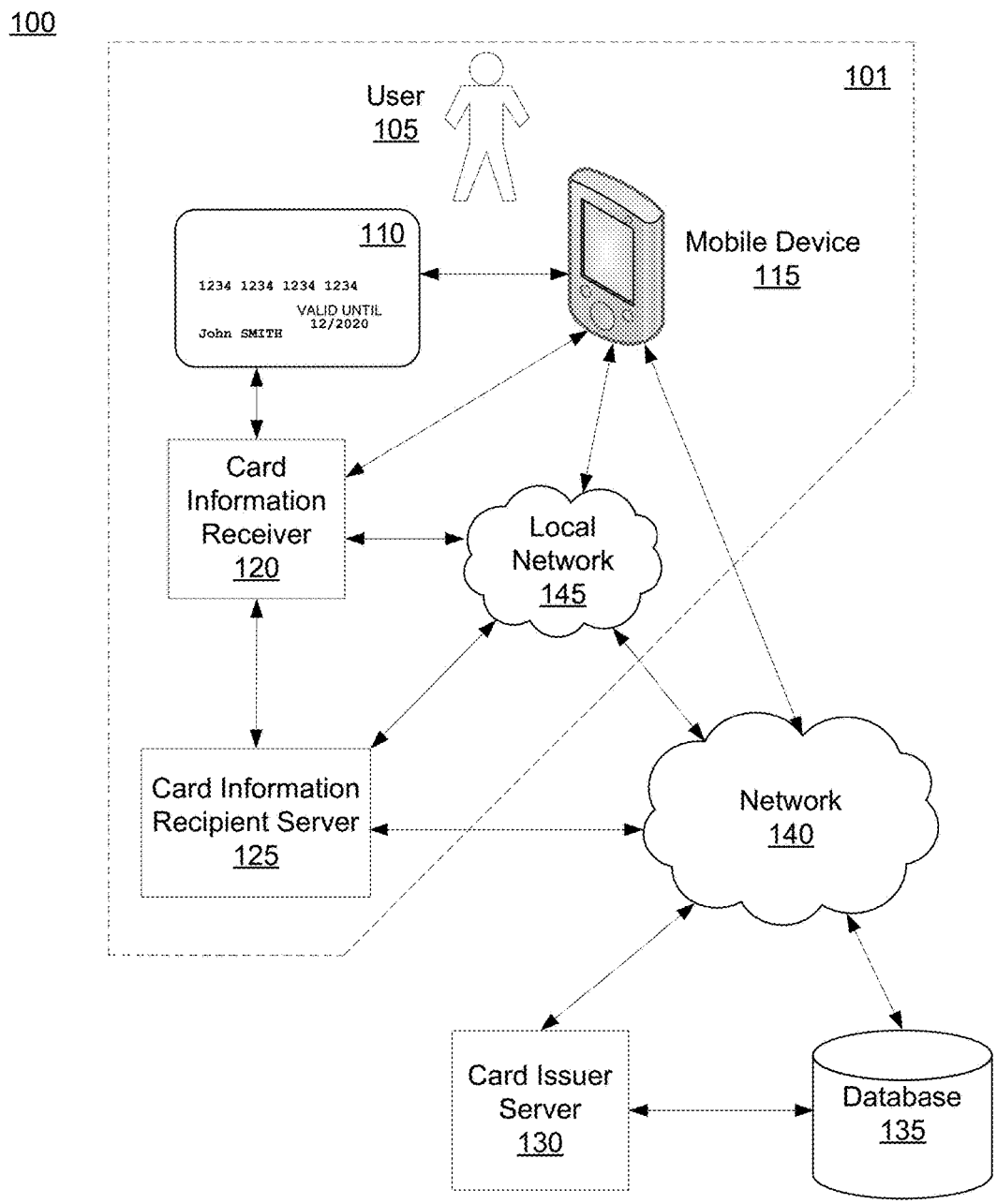
FIG. 1 is a diagram of an exemplary system that may be used to activate account card functions using physical gestures, consistent with disclosed embodiments.

FIG. 1 shows a diagram of an exemplary system 100 that may be configured to perform one or more processes for enabling transmission of account information based on detection of a motion pattern. The components and arrangements shown in FIG. 1 are not intended to limit the disclosed embodiments, as the components used to implement the disclosed processes and features may vary.

In accordance with disclosed embodiments, system 100 may include account card 110, mobile device 115, card information receiver 120, card information recipient server 125, card issuer server 130, database 135, network 140, and local network 145. Other components known to one of ordinary skill in the art may be included in system 100 to gather, process, transmit, receive, and provide information used in conjunction with the disclosed embodiments.

Account card 110 and/or mobile device 115 may be associated with a user 105. In some embodiments, user 105 is an individual associated with one or more accounts. In some embodiments, account card 110 may comprise an ID card, a membership card, a credit card, a debit card, an ATM card, a gift card, or any other type of card associated with at least one account. Those of ordinary skill in the art will appreciate that the present embodiments may be used to enable transmission of any type of data stored on account card 110, and the present embodiments are not limited to account information such as account numbers.

Mobile device 115 may be a personal computing device such as, for example, a mobile device with computing ability, a tablet, smartphone, wearable device such as Google Glass™ or smart watches, a general purpose or notebook computer, or any combination of these computers and/or affiliated components. In one embodiment, mobile device 115 may be a computer system or mobile computer device that is operated by user 105 who is associated with an account for which account card 110 is issued.

Card information receiver 120 may comprise one or more computerized devices configured to receive account information. In some embodiments, card information receiver 120 may include a magnetic stripe reader, a near field communication (NFC) transceiver, an RFID reader, a wireless antenna, a barcode scanner, or any other type of device capable of receiving account information.

Card information recipient server 125 may be operated by one or more entities that wish to receive account information. Such entities (not shown in figures) may include, for example, a government agency, a store, a bank, an ATM, a library, a hotel, a membership facility such as a fitness center, a restaurant, and any other type of individual or organization that requests and receives information from individuals. Card information recipient server 125 may be a computer-based system including computer system components, desktop computers, workstations, tablets, hand held computing devices, memory devices, and/or internal network(s) connecting the components. In some embodiments, card information receiver 120 and card information recipient server 125 may be located region 101, and geographically separated from card issuer server 130 and/or database 135. In some embodiments, user 105 may visit region 101 and provide account information to card information recipient server 125 via account card 110 and card information receiver 120.

Card issuer server 130 may include one or more computer-based systems including computer system components, desktop computers, workstations, tablets, hand held computing devices, memory devices, and/or internal network(s) connecting the components. Card issuer server 130 may be owned and/or operated by an entity responsible for issuing (e.g., creating or authorizing the creation of) account card 110 and maintaining one or more accounts associated with account card 110. In some embodiments, card issuer server 130 is associated with one or more of a membership facility such as a fitness center, a government organization such as a state government or department of motor vehicles, a bank, a credit card company, a hotel, or any other entity that may issue cards such as account card 110, and maintain one or more accounts.

Database 135 may include one or more memory devices that store data and instructions used to perform one or more features of the disclosed embodiments. Database 135 may also include any combination of one or more databases controlled by memory controller devices (e.g., server(s), etc.) or software, such as document management systems, Microsoft SQL databases, Share Point databases, Oracle™ databases, Sybase™ databases, or other relational databases. In some embodiments, database 135 may comprise an associative array architecture, such as a key-value storage, for storing and rapidly retrieving large amounts of information about an individual. In some embodiments, database 135 may store information associated with one or more accounts, such as an account associated with account card 110 and user 105.

Network 140 may comprise any type of computer networking arrangement used to exchange data. For example, network 140 may be the Internet, a private data network, virtual private network using a public network, and/or other suitable connection(s) that enables system 100 to send and receive information between the components of system 100. Network 140 may also include a public switched telephone network ("PSTN") and/or a wireless network such as a cellular network, WiFi network, or other known wireless network capable of bidirectional data transmission.

Local network 145 may comprise any type of computer networking arrangement used to exchange data in a localized area, such as WiFi, Bluetooth™' Ethernet, and other suitable network connections that enable components of system 100 to interact with one another and to connect to network 140 for interacting with components in system environment 200. In some embodiments, local network 145 comprises a portion of network 140. In other embodiments, components of system 100 may communicate via network 140, without a separate local network 145.

Figure 2:
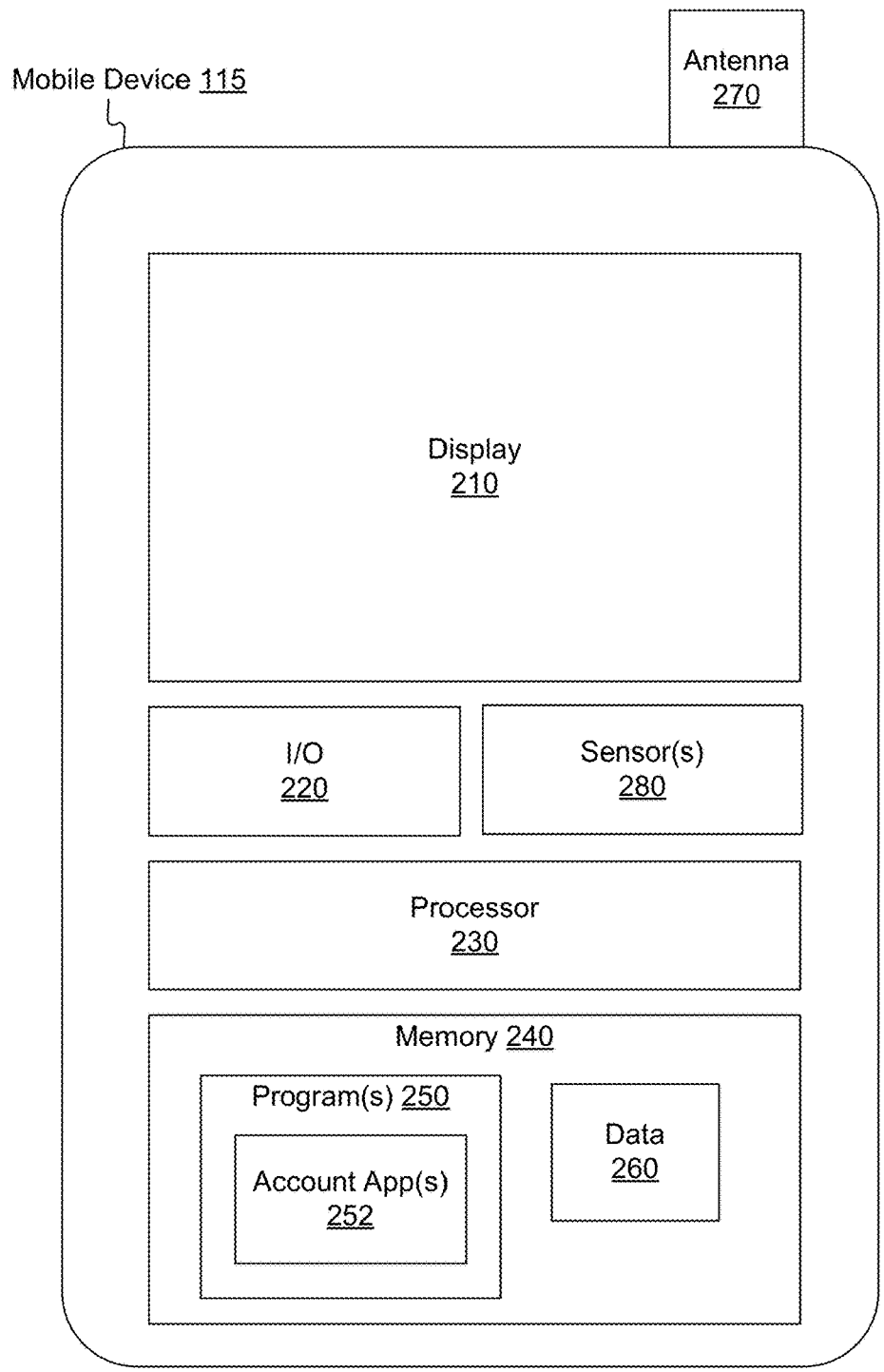
FIG. 2 is a diagram of an exemplary mobile device, consistent with disclosed embodiments.

FIG. 2 shows a diagram of an exemplary mobile device 115, consistent with disclosed embodiments. As shown, mobile device 115 may include a display 210, input/output ("I/O") devices 220, one or more processors 230, memory 240 having stored thereon one or more programs 250, such as account app 252, and also storing data 260, and may further include an antenna 270 and one or more sensors 280. One or more of display 210, I/O devices 220, processor(s) 230, memory 240, antenna 270, or sensor(s) 280 may be connected to one or more of the other devices depicted in FIG. 2. Such a connection may be accomplished using a bus or other interconnecting device.

I/O devices 220 may include one or more devices that customer device 110 to receive input from user 105 and provide feedback to user 105. I/O devices 220 may include, for example, one or more buttons, switches, speakers, microphones, or touchscreen panels. In some embodiments, I/O devices 220 may be manipulated by user 105 to input information into mobile device 115.

Processor 230 may be one or more known processing devices, such as a microprocessor from the Pentium™ or Atom™ families manufactured by Intel™, the Turion™ family manufactured by AMD™, the Exynos™ family manufactured by Samsung™, or the Snapdragon™ family manufactured by Qualcomm™. Processor 230 may constitute a single core or multiple core processors that executes parallel processes simultaneously. For example, processor 230 may be a single core processor configured with virtual processing technologies. In certain embodiments, processor 230 may use logical processors to simultaneously execute and control multiple processes. Processor 230 may implement virtual machine technologies, or other known technologies to provide the ability to execute, control, run, manipulate, store, etc. multiple software processes, applications, programs, etc. In another embodiment, processor 230 may include a multiple-core processor arrangement (e.g., dual, quad core, etc.) configured to provide parallel processing functionalities to allow mobile device 115 to execute multiple processes simultaneously. One of ordinary skill in the art would understand that other types of processor arrangements could be implemented that provide for the capabilities disclosed herein.

Memory 240 may be a volatile or non-volatile, magnetic, semiconductor, tape, optical, removable, non-removable, or other type of storage device or tangible (i.e., non-transitory) computer-readable medium that stores one or more program (s) 250 such as account app 252, and data 260. Data 260 may include, for example, user 105's personal information, account information, and display settings and preferences. In some embodiments, account information may include items such as, for example, an alphanumeric account number, account label, account balance, account issuance date, account expiration date, account issuer identification, a government ID number, a room number, a room passcode, and any other necessary information associated with user 105 and/or an account associated with user 105, depending on the needs of user 105, entities associated with card information recipient server 125, and/or entities associated with card issuer server 130.

Program(s) 250 may include operating systems (not shown) that perform known operating system functions when executed by one or more processors. By way of example, the operating systems may include Microsoft Windows™, Unix™, Linux™, Apple™, or Android™ operating systems, Personal Digital Assistant (PDA) type operating systems, such as Microsoft CE™, or other types of operating systems. Accordingly, disclosed embodiments may operate and function with computer systems running any type of operating system. Mobile device 115 may also include communication software that, when executed by a processor, provides communications with network 140, such as Web browser software, tablet, or smart hand held device networking software, etc. Mobile device 115 may be a device that executes mobile applications for performing operations consistent with disclosed embodiments, such as a tablet or mobile device.

Program(s) 250 may include account app(s) 252, such as an account for activating, setting up, and configuring account card 110. In some embodiments, account app 252 may include instructions which cause processor 230 to connect to account card 110 and/or card issuer server 130 via a direct wireless connection, via network 140, or via local network 145. In some embodiments, account app 252 may configure account card 110 by detecting a motion pattern, verifying the detected motion pattern, and transmitting the motion pattern to account card 110 for storage and later comparison. In some embodiments, account app 252 may allow user 105 to configure settings for one or more motion patterns associated with account card 110.

Sensors 280 may include one or more devices capable of sensing the environment around mobile device 115 and/or movement of mobile device 115. In some embodiments, sensors 280 may include, for example, an accelerometer, a shock sensor, a gyroscope, a position sensor, a microphone, an ambient light sensor, a temperature sensor, and/or a conductivity sensor.

Figure 3:
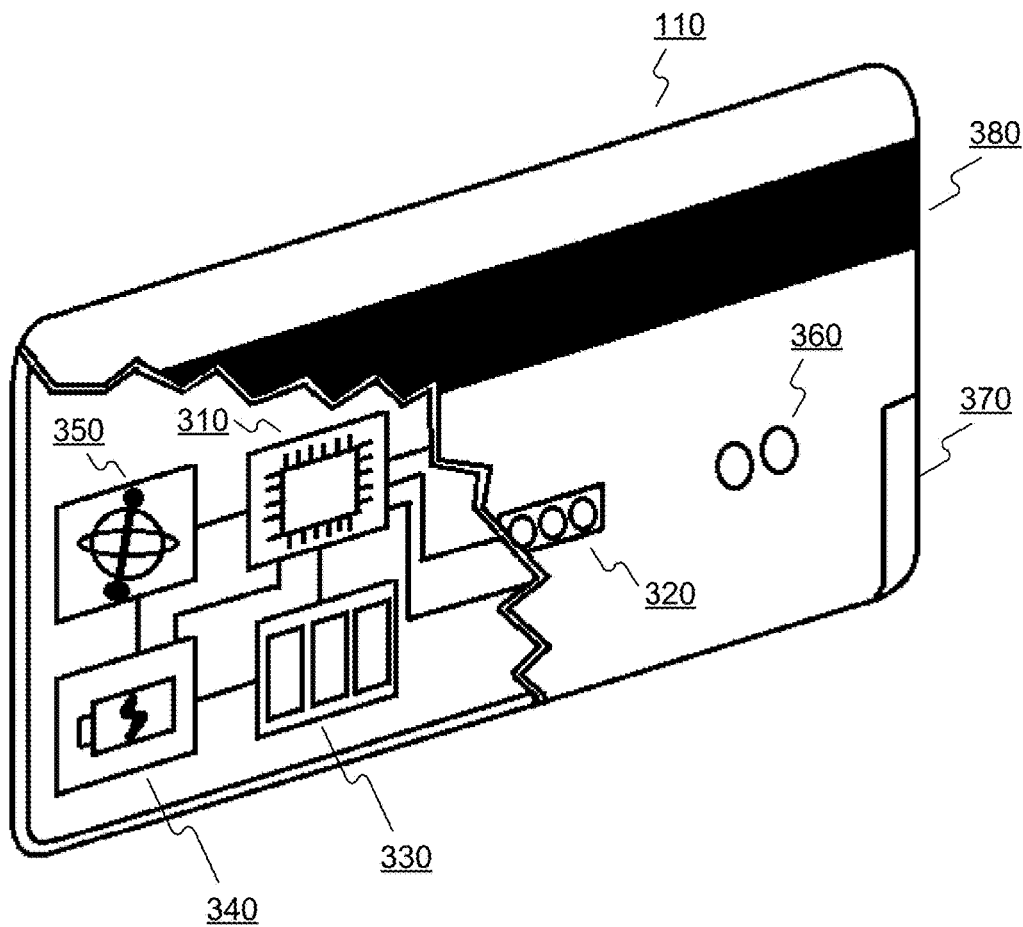
FIG. 3 is a diagram of an exemplary account card, consistent with disclosed embodiments.

FIG. 3 shows a diagram of an exemplary account card 110, consistent with disclosed embodiments. As shown, account card 110 may include processor 310, display 320, memory 330, power source 340, one or more sensors 350, input devices 360, antenna 370, and magnetic stripe 380. In some embodiments, account card 110 may include more or fewer components than shown in FIG. 3. As depicted in FIG. 3, one or more of processor 310, display 320, memory 330, power source 340, one or more sensors 350, input devices 360, antenna 370, and magnetic stripe 380 may be connected to one or more of the other devices depicted in FIG. 3. Such a connection may be accomplished using a bus or other interconnecting device.

In some embodiments, account card 110 may comprise an ID card, a membership card, a credit card, a debit card, an ATM card, a gift card, or any other type of card associated with at least one account. In some embodiments, account card 110 may comprise a device worn and/or carried by user 105 such as, for example, a fob, a key fob, a wristband, a necklace, or any other portable electronic device. In some embodiments, account card 110 may include at least one data transmitter for providing account information, such as magnetic stripe 380, or antenna 370, such as a near field communication chip or a short range wireless transceiver.

Processor 310 may comprise one or more known or specialized processing devices, of sufficient size and form factor to fit within a card such as account card 110. In some embodiments, processor 310 may constitute a single or multiple core processor capable of performing functions related to the disclosed methods such as, for example, controlling power source 340, sending and receiving data, reading and writing memory 330, receiving and analyzing data from sensors 350, generating information for presentation on display 320, receiving and processing input from I/O devices 360, and any other functions consistent with the disclosed embodiments.

Display 320 may comprise a screen, indicator light, or other appropriate device for displaying a status or message to user 105. In some embodiments, display 320 may include a small LCD screen, e-ink screen, or OLED display. In other embodiments, display 320 may include one or more Light Emitting Diodes (LEDs). In some embodiments, display 320 may provide notifications, prompts, and/or messages to user 105, such as status messages indicating whether account card 110 is powered on, whether account card 110 is ready to detect a motion pattern, whether a detected motion pattern is verified or requires verification, whether account information is transmitting or successfully transmitted, and any other notifications and messages consistent with disclosed embodiments.

Memory 330 may include a volatile or non-volatile, magnetic, semiconductor, or other type of storage device or tangible (i.e., non-transitory) computer-readable medium that stores one or more motion patterns, account information, computer-executable instructions, and in some embodiments, one or more settings associated with one or more stored motion patterns.

Power source 340 may include a power storage device such as a battery or capacity, a power receiver such as an inductive power coil or a wireless power receiver, a power generator such as a solar or kinetic power generator, or any combination thereof. In some embodiments, power source 340 may include one or more other known devices capable of generating, receiving, and/or storing electricity. In some embodiments, power source 340 may be combined or integrated with sensor 350, such as a piezoelectric sensor configured to detect motion and to generate electricity from the detected motion.

In some embodiments, account card 110 may receive power from an external source, such as wireless power or inductive power. In such embodiments, power source 340 may automatically activate in response to a sufficient level of ambient power, and power source 340 may provide power to processor 310 to activate account card 110. In some embodiments, account card 110 may include a generator which produces energy in response to movement, sunlight, and any other known power generation means capable of fitting within account card 110. In such embodiments, power source 340 may continue generating power and storing generated power in a battery or capacitor of power source 340, for later use. In some embodiments, power source 340 may comprise a battery or capacitor sealed within account card 110, either having an external charging port or no charging port, requiring replacement of account card 110 upon depletion of power source 340. In other embodiments, power source 340 may comprise a removable and/or replaceable battery or capacitor.

Sensors 350 may include one or more devices capable of sensing the environment around account card 110 and/or movement of account card 110. In some embodiments, sensors 350 may include, for example, an accelerometer, a shock sensor, a gyroscope, a position sensor, a microphone, an ambient light sensor, a temperature sensor, and/or a conductivity sensor.

In some embodiments, processor 310 may detect motion patterns associated with multiple sensors, such as a sequence of taps on a first side of account card 110, followed by a sequence of taps on a second side of account card 110. In some embodiments, account card 110 may detect such motion patterns using a single sensor 350, such as a multi-axis accelerometer. In some embodiments, account card 110 may include multiple sensors 350 located on different sides, edges, or faces of account card 110 to detect complex motion patterns.

Input devices 360 may include one or more buttons, switches, or other forms of input mechanisms for receiving an indication or instruction from user 105. In some embodiments, input devices 360 may receive a sequence or series of inputs, to cause processor 310 to perform various functions associated with the disclosed embodiments.

In some embodiments, account card 110 may include antenna 370, for transmitting and/or receiving data from one or more external locations. Antenna 370 may comprise a short-range wireless antenna, a near-field communication chip, or other device.

In some embodiments, account card 110 may include magnetic stripe 380, which may be controlled by processor 310. For example, processor 310 may write, clear, and rewrite magnetic stripe 380, to provide particular account information once account card 110 is activated and has detected a verified motion pattern.

Figure 4:
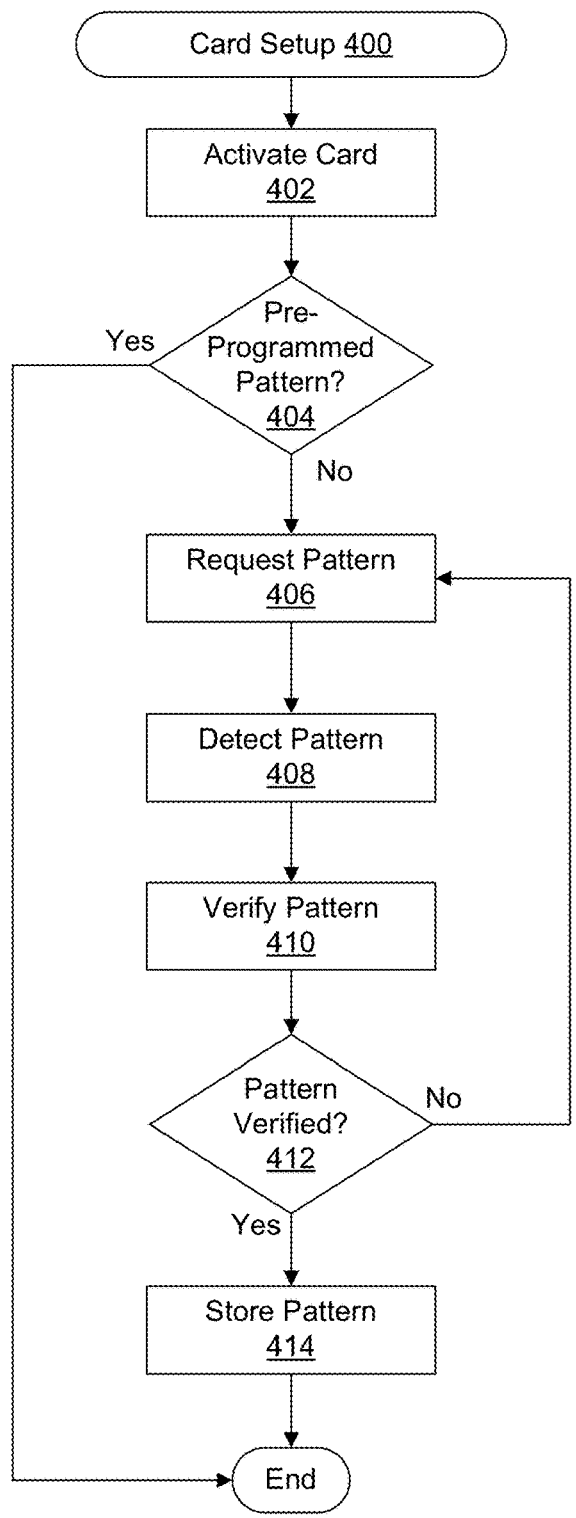
FIG. 4 is a flowchart of an exemplary account card setup process, consistent with disclosed embodiments.

FIG. 4 is a flowchart of an exemplary account card setup process 400, consistent with disclosed embodiments. In the example shown in FIG. 4, process 400 is performed by processor 310 of account card 110. In some embodiments, however, some or all steps of process 400 may be performed by a processor other than processor 310. Those of ordinary skill may also understand that process 400 may include more or fewer steps, and some steps may be performed in a different order than illustrated in FIG. 4.

In step 402, processor 310 may activate account card 110. In some embodiments, processor 310 may detect an initial power-up, such as activation of power source 340, or an input received via input devices 360. In some embodiments, account card 110 may activate in response to data detected from one or more sensors 350, such as an ambient light sensor. For example, user 105 may remove account card 110 from a wallet, and account card 110 may activate when the ambient light sensor becomes exposed to light. In other embodiments, account card 110 may activate in response to movement that causes power source 340 to generate sufficient electricity to power processor 310, such as a kinetic energy generator.

In step 404, processor 310 may determine whether a motion pattern is preprogrammed in memory 330. In some embodiments, card issuer server 130 may preprogram a motion pattern into account card 110 memory 330, so that user 105 need not perform process 400, but instead may begin using account card 110 immediately. For example, a hotel or fitness center may wish to use a single motion pattern for all guests and members, to prevent non-guests and non-members from using the cards. In such embodiments, card issuer server 130 may generate and store a motion pattern in memory 330, which all guests and members may use to activate their account cards. If processor 310 determines that a motion pattern is preprogrammed ("yes" in step 404), then process 400 may end.

If processor 310 determines that there are no preprogrammed motion patterns ("no" in step 404), then in step 406 processor 310 may cause account card 110 to request a motion pattern by prompting user 105 to perform a physical gesture while holding account card 110. In some embodiments, account card 110 may provide a prompt via display 320, such as a message and/or colored LED or light pattern, to perform a physical gesture. In other embodiments, account card 110 may include a sound generator (not shown in figures) such as a speaker or beeper, for prompting user 105 to perform a physical gesture.

In step 408, processor 310 may detect a motion pattern sensed using sensors 350, in response to the physical gesture performed by user 105.

In step 410, processor 310 may verify the detected motion pattern. In process 400, processor 310 may verify the detected motion pattern by prompting user 105 to perform the physical gesture a second time, producing a motion pattern that matches the first motion pattern. In other embodiments, account card 110 may prompt user 105 to select one of input devices 360 to indicate whether the motion pattern is verified, or should be cleared and detected again.

In step 412, processor 310 may determine whether pattern is verified from step 410. If the motion pattern is not verified ("no" in step 412), then process 400 may return to step 406 and account card 110 may request a new motion pattern. If the motion pattern is verified ("yes" in step 412), then in step 414 processor 310 may store the motion pattern in memory 330, for use as a reference pattern for comparing subsequently detected motion patterns. After storing the motion pattern, process 400 may end. After a predetermined period of time, account card 110 may power off. In some embodiments, account card 110 may additionally or alternatively power off when a level of electricity generated or provided by power source 340 falls below a predetermined threshold.

Figure 5:
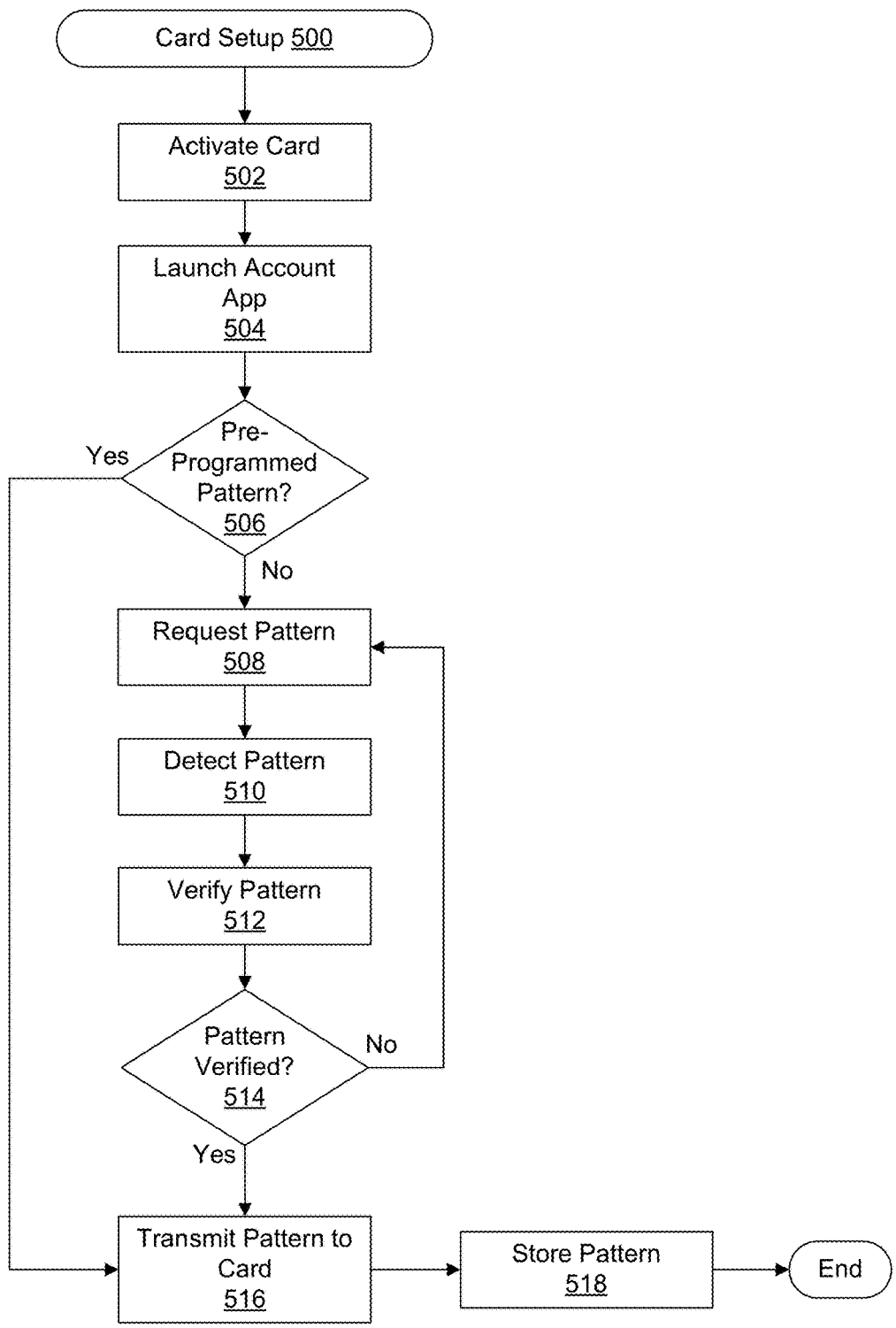
FIG. 5 is a flowchart of another exemplary account card setup process, consistent with disclosed embodiments.

FIG. 5 is a flowchart of another exemplary account card setup process 500. As described below, process 500 is performed using mobile device 115 (such as processor 230) in combination with processor 311 to setup account card 110.

In step 502, processor 311 may activate account card 110, similar to step 402 described above with respect to FIG. 4. In some embodiments, processor 311 may also begin scanning available communication channels for mobile device 115 using antenna 370.

In step 504, mobile device 115 may launch account app 252. Account app 252 may cause mobile device 115 to link wirelessly with account card 110 via wireless communication between antennas 270 and 370 (step not shown).

In step 506, mobile device 115 may determine whether one or more motion patterns are preprogrammed in account card 110. In some embodiments, mobile device 115 may query memory 340 of account card 110, to determine if any motion patterns are stored. If a motion pattern is stored on account card 110 ("yes" in step 506), then process 500 may end. If no motion pattern is stored ("no" in step 506), then in step 508 mobile device 115 may request a motion pattern by prompting user 105 to perform a physical gesture involving mobile device 115.

In step 510, mobile device 115 may detect a motion pattern using one or more sensors 280.

In step 512, mobile device 115 may verify the detected motion pattern, similar to step 410 of process 400.

In step 514, mobile device 115 may determine if pattern is verified, similar to step 412 of process 400. If mobile device 115 determines that the detected motion pattern is not verified ("no" in step 514), process 500 may return to step 508, and mobile device 115 may request an another motion pattern.

If mobile device 115 determines that the detected motion pattern is verified ("yes" in step 514), then in step 516, mobile device 115 may transmit the verified motion pattern to account card 110 via antennas 270 and 370. Account card 110 may store the received motion pattern in memory 330 in step 518. After storing the received motion pattern, process 500 may end.

In some embodiments, process 500 may allow user 105 to attach one or more settings to one or more motion patterns (not shown in figures). Using mobile device 115, user 105 may have access to a robust interface of options and features that may be associated with stored motion patterns. For example, user 105 may create a first motion pattern that causes account card 110 to provide first account information, such as a first account number. User 105 may also create a second motion pattern that may cause account card 110 to provide second account information, such as a second account number. In some embodiments, user 105 may store different motion patterns for different users of account card 110, and/or different limitations on account card 110. For example, a first motion pattern may be stored for a first individual to use for activating account card 110, and a second motion pattern may be stored for a second individual to use for activating account card 110. As another example, a first motion pattern may activate account card 110 with a first spending limit, and a second motion pattern may activate account card 110 with a second spending limit. Settings may be configured using mobile device 115, and transmitted to account card 110 for storage in memory 340.

Figure 6:
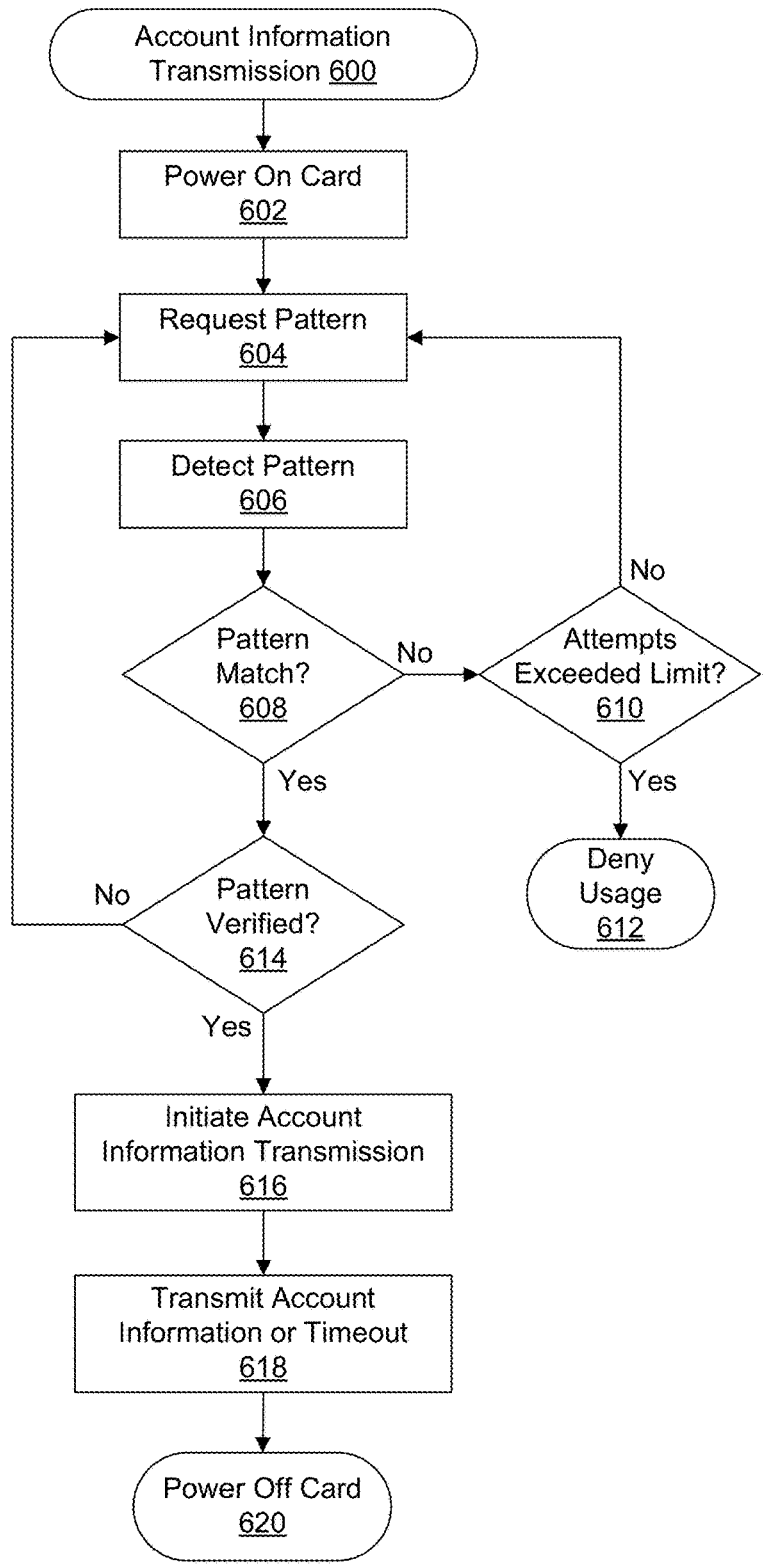
FIG. 6 is a flowchart of an exemplary account information transmission process, consistent with disclosed embodiments.

FIG. 6 is a flowchart of an exemplary account information transmission process 600. As described herein, process 600 is performed by account card 110 processor 310. In some embodiments, one or more steps of process 600 may be performed using a different processor, such as processor 230 of mobile device 115.

In step 602, processor 310 may power on account card 110. Similar to step 402 of process 400, processor 310 may power on account card 110 in response to an input via input devices 360, kinetic power generation, detection of ambient power and inductive power, or based on data from sensors 350 such as exceeding an ambient light threshold level.

In step 604, account card 110 may request a motion pattern by prompting user 105 to perform a physical gesture. Similar to step 406 of process 400, account card 110 may provide a visual indicator on display 320, instructing user 105 to perform a physical gesture. In some embodiments, account card 110 may include a beeper or speaker (not shown in figures) for providing an audible prompt to perform a physical gesture.

In step 606, processor 310 may detect a motion pattern corresponding to a physical gesture performed by user 105 using account card 110. In some embodiments, processor 310 may receive data from sensors 350 and process the received data to detect the motion pattern.

In step 608, processor 310 may determine if the detected motion pattern matches at least one stored motion pattern in memory 330. In some embodiments, processor 310 may compare the detected motion pattern to stored motion patterns, such as motion patterns stored in processes 400 and 500. In some embodiments, motion pattern comparison may comprise a statistical analysis of the detected and stored motion patterns, extracting features in sensor data for the motion patterns, and determining a similarity between the detected and stored motion patterns. In some embodiments, processor 310 may employ a confidence level or probability score to determine whether the detected motion pattern matches at least one stored motion pattern.

If processor 310 determines that the detected motion pattern does not match any stored motion patterns ("no" in step 608), then in step 610 processor 310 may determine whether a number of consecutive attempts have exceeded a predetermined limit. In some embodiments, processor 310 may determine whether a predetermined number of failed attempts have occurred in a predetermined time period. If not ("no" in step 610), then process 600 may return to step 604, and account card 110 may request another motion pattern entry by prompting user 105 to perform another physical gesture.

If attempts have exceeded a predetermined limit ("yes" in step 610) then in step 612 processor 310 may deny usage of account card 110, and refuse to perform any function. Process 600 may then end. In some embodiments, processor 310 may allow additional attempts to use account card 110 after another predetermined time period has elapsed.

Returning to step 608, if the detected pattern matches at least one stored motion pattern ("yes" in step 608), then in step 614 processor 310 may determine if motion pattern is verified. In some embodiments, processor 310 may prompt user 105 to perform the same physical gesture again to confirm the proper motion pattern. In other embodiments, processor 310 may determine whether the confidence value or probability score exceeds a predetermined threshold (such as 95% or 0.95 confirmed). In such embodiments, processor 310 may determine that the motion pattern is not verified if the confidence value is below the predetermined threshold, even though the motion pattern may be determined to tentatively "match" a stored motion pattern.

If processor 310 determines that the motion pattern is not verified ("no" in step 614), then process 600 may return to step 604, and account card 110 may request a new motion pattern by prompting user 105 to perform another physical gesture.

If the detected motion pattern is verified ("yes" in step 614), then in step 616 processor 310 may initiate account information transmission from account card 110 to card information receiver 120. In step 616, processor 310 may determine whether any settings and/or limits are associated with the matched motion pattern. Processor 310 may then retrieve account information associated with the matched motion pattern, the settings, and/or limits. Processor 310 may also activate one or more data transmitters configured to provide the retrieved account information. In some embodiments, processor 310 may write magnetic stripe 380 to include the retrieved account information. In other embodiments, processor 310 may enable antenna 370 to transmit account information via near field communication or short range wireless transmission. In other embodiments, processor 310 may encode a radio frequency ID (RFID) chip with the retrieved account information, or enable a RFID chip such as an EMV (Europay, Mastercard, Visa) chip to communicate with a contact or non-contact reader. In some embodiments, processor 130 may cause display 320 to display the retrieved account information, when display 320 is capable of providing alphanumeric characters.

In step 618, account card 110 may transmit account information via magnetic stripe 380, antenna 370, or other suitable mechanism, to an external device such as card information receiver 120, for use by card information recipient server 125. In some situations, if transmission is not completed within a predetermined amount of time, account card 110 may timeout.

After completion of account information transmission or a timeout, processor 310 may power off account card 110, and process 600 may end in step 620. In some embodiments, processor 310 may delete account information from magnetic stripe 380 or any memory buffer in antenna 370, and processor 310 may clear any account information transmission mechanisms so that account information will not be provided again until processor 310 receives another matching motion pattern. Thus, the disclosed embodiments may provide a secure, motion pattern—type password—protected storage of account information, in a form factor that is small, convenient, and able to be used with a vast infrastructure of card reading equipment.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A user account apparatus for providing account information, comprising:
   a housing;
   a power source;
   a sensor;
   a data transmitter;
   at least one memory storing instructions and account information; and
   at least one processor configured to execute the stored instructions to perform operations comprising:
      receiving a predefined motion pattern from a mobile device in wireless communication with the user account apparatus;
      storing the predefined motion pattern in the memory;
      detecting, using the sensor, a user motion pattern corresponding to a physical gesture performed using the user account apparatus;
      analyzing the detected motion pattern using the predefined motion pattern;
      activating, based on the detected motion pattern, the data transmitter to provide the stored account information from the user account apparatus to a card information receiver; and
      transmitting, from the user account apparatus, the stored account information to the card information receiver.

2. The apparatus of claim 1, wherein the power source comprises a wireless power receiver.

3. The apparatus of claim 1, wherein the data transmitter comprises a magnetic stripe.

4. The apparatus of claim 1, wherein the data transmitter comprises a near field communication chip.

5. The apparatus of claim 1, wherein the detected motion pattern comprises a plurality of movements performed in a sequence.

6. The apparatus of claim 1, wherein the operations further comprise deactivating the data transmitter after at least one of transmitting the stored account information or expiration of a predetermined period of time.

7. The apparatus of claim 1, wherein the operations further comprise storing at least a first motion pattern for a first user and a second motion pattern for a second user in the memory.

8. The apparatus of claim 1, wherein the operations further comprise establishing settings for a plurality of users.

9. The apparatus of claim 8, wherein the settings are associated with a financial service provider.

10. The apparatus of claim 9, wherein the operations further comprise communicating with a financial service provider server.

11. A system for providing account information from a user account apparatus, comprising:
   a housing;
   a power source;
   a sensor;
   a data transmitter;
   at least one memory storing instructions and account information; and
   at least one processor configured to execute the stored instructions to perform operations comprising:
      receiving a predefined motion pattern from a mobile device in wireless communication with the user account apparatus;
      storing the predefined motion pattern in the memory;
      detecting, using the sensor, a user motion pattern corresponding to a physical gesture performed using the user account apparatus;
      analyzing the detected motion pattern using the predefined motion pattern;
      activating, based on the detected motion pattern, the data transmitter to provide the stored account information from the user account apparatus to a card information receiver; and
      transmitting, from the user account apparatus, the stored account information to the card information receiver.

12. The system of claim 11, wherein the power source comprises a wireless power receiver.

13. The system of claim 11, wherein the data transmitter comprises a magnetic stripe.

14. The system of claim 11, wherein the data transmitter comprises a near field communication chip.

15. The system of claim 11, wherein the detected motion pattern comprises a plurality of movements performed in a sequence.

16. The system of claim 11, wherein the operations further comprise deactivating the data transmitter after at least one of transmitting the stored account information or expiration of a predetermined period of time.

17. The system of claim 11, wherein the operations further comprise storing at least a first motion pattern for a first user and a second motion pattern for a second user in the memory.

18. The system of claim 11, wherein the operations further comprise establishing settings for a plurality of users.

19. The system of claim 18, wherein the settings are associated with a financial service provider.

20. The system of claim 19, wherein the operations further comprise communicating with a financial service provider server.

* * * * *